United States Patent
Fischer et al.

(10) Patent No.: US 8,299,647 B2
(45) Date of Patent: Oct. 30, 2012

(54) SWITCHABLE CURRENT SUPPLY FOR AUXILIARY CURRENT CIRCUITS IN A CURRENT CONVERTER

(75) Inventors: Klaus Fischer, Friedberg (DE); Josef Kreittmayr, Bobingen (DE)

(73) Assignee: Osram AG, Munich (DE)

( * ) Notice: Subject to any disclaimer, the term of this patent is extended or adjusted under 35 U.S.C. 154(b) by 348 days.

(21) Appl. No.: 12/742,949

(22) PCT Filed: Nov. 15, 2007

(86) PCT No.: PCT/EP2007/062391
§ 371 (c)(1),
(2), (4) Date: May 14, 2010

(87) PCT Pub. No.: WO2009/062554
PCT Pub. Date: May 22, 2009

(65) Prior Publication Data
US 2010/0259103 A1    Oct. 14, 2010

(51) Int. Cl.
*H05K 1/02* (2006.01)
*H02J 3/00* (2006.01)
(52) U.S. Cl. .......................... 307/42; 307/72
(58) Field of Classification Search .................. 307/72, 307/75, 43, 42; 315/162
See application file for complete search history.

(56) References Cited

U.S. PATENT DOCUMENTS

| | | | |
|---|---|---|---|
| 4,704,542 A | 11/1987 | Hwang | |
| 6,731,078 B2 | 5/2004 | Huber et al. | |
| 7,312,597 B2 * | 12/2007 | Fahlenkamp et al. | 323/222 |
| 2006/0273737 A1 | 12/2006 | Heckmann | |

FOREIGN PATENT DOCUMENTS

| | | |
|---|---|---|
| DE | 19542012 A1 | 5/1997 |
| EP | 1231821 B1 | 8/2004 |
| EP | 1729546 A1 | 12/2006 |

OTHER PUBLICATIONS

International Search Report of PCT/EP2007/062391 mailed on Oct. 21, 2008.
Abstract for DE 195 42 012 A1.

* cited by examiner

*Primary Examiner* — Michael Rutland Wallis

(57) ABSTRACT

A circuit arrangement with a switchable voltage supply for a control apparatus may include a DC voltage supply terminal; and an AC voltage supply terminal; a control apparatus including at least one input, an output and at least one supply terminal; three electronic switches, each having a control electrode, a reference electrode and a working electrode, wherein the reference electrode of the first electronic switch and of the second electronic switch is coupled to the first node; wherein the working electrode of the first electronic switch is coupled to the supply terminal of the control apparatus; wherein the control electrode of the first electronic switch is coupled to a reference potential, wherein at least one further load is coupled to the working electrode of the second electronic switch.

14 Claims, 3 Drawing Sheets

SWITCHABLE CURRENT SUPPLY FOR AUXILIARY CURRENT CIRCUITS IN A CURRENT CONVERTER

Circuit arrangement with a switchable voltage supply for a control apparatus and method for switching over a voltage supply for a control apparatus

RELATED APPLICATIONS

The present application is a national stage entry according to 35 U.S.C. §371 of PCT application No.: PCT/EP2007/062391 filed on Nov. 15, 2007.

TECHNICAL FIELD

Various embodiments relate to a circuit arrangement with a switchable voltage supply for a control apparatus, wherein the circuit arrangement includes a DC voltage supply terminal for connection to a DC voltage source and an AC voltage supply terminal for connection to an AC voltage source. Various embodiments moreover relate to a method for switching over a voltage supply for a control apparatus in such a circuit arrangement.

BACKGROUND

In circuit arrangements, in particular electronic ballasts for operating discharge lamps which are not constructed as a freely oscillating oscillator and therefore contain component parts for controlling the electronic ballast, it is necessary to make available sufficient supply power, which is appropriate for the operating state, for these control component parts.

In general, there are two different operating states: firstly the run up state which is run through once the supply voltage has been applied and secondly the normal operating mode which occurs during operation.

The run up state is characterized by the fact that a supply capacitor is charged in a simple manner via a run up resistor which has as high a resistance value as possible, said supply capacitor at the same time acting as a buffer for the supply of at least one control component part. If the charge voltage reaches a value which is sufficient for the control component part, said control component part begins to operate and controls, for example, the transistors of the ballast; the normal operating mode has been reached. In this run up state, control component parts require significantly less current, the so-called run up current, than in the normal operating mode.

In the normal operating mode, the buffer capacitor is generally charged via a charge pump in order to make available the markedly higher current requirement of the control component parts in the normal operating mode. This charge pump generally includes two diodes and a capacitor, which is coupled firstly to a potential with a high AC voltage content, for example the half-bridge center point of a bridge circuit in the form of a half bridge, and secondly to the two diodes.

In relatively complex ballasts, there is a large number of control component parts which need to be supplied with power in the normal operating mode, but the current supply to said control component parts needs to be interrupted during the run up state in order to keep the current required for charging the supply capacitor as small as possible and therefore to minimize the losses in the run up resistor during operation.

In specific cases, it may now be necessary to cease the operation of the ballast, but nevertheless to supply current to at least individual parts of the control circuit. This may be the case, for example, if the operation of the ballast needs to be ceased owing to an excessively low supply voltage and the device needs to be set to sleep mode, but needs to be started again when there is sufficient voltage again. Other possible criteria would be, for example, a switch-off operation brought about by an operator or by an automatic timer. The determination of a value which is again sufficient for the supply voltage or renewed startup as desired by an operator or an automatic timer need to take place by means of a control component part, such as a microcontroller, for example, which needs to be supplied with a low current even in this sleep mode for this purpose.

SUMMARY

Various embodiments develop a circuit arrangement of the type mentioned at the outset and a method of the type mentioned at the outset in such a way that the circuit arrangement can be set into a sleep mode by a control apparatus when criteria which are irrelevant here are met and can be held in this sleep mode. As soon as the criteria are no longer met, the control apparatus should resume the operation of the circuit arrangement.

Various embodiments are based on the knowledge that the effect can be achieved if, in order to cease normal operation, i.e. in order to achieve the sleep mode, the supply voltage of the drive circuit which is used for driving the switches of an inverter is drawn by a switch below a threshold value, at which the drive circuit transfers to an inactive state, into the so-called undervoltage lockout. A charge pump, whose input is coupled to an AC voltage source of the inverter, therefore no longer makes current available for supplying other control component parts. At the same time, a supply path is then isolated via this switch, via which supply path current is conducted via the run up resistor to the supply potential of the control apparatus in order to supply power to said control apparatus.

This is achieved by virtue of a circuit arrangement of the generic type furthermore including: a first capacitor, which is referred to above as the supply capacitor, whose first terminal is coupled to the DC voltage supply terminal via a first non-reactive resistor, the so-called run up resistor, so as to form a first node, and whose second terminal is coupled to a reference potential, a drive circuit for driving the switch of an inverter, wherein the drive circuit has a supply terminal, which is coupled to the first node, a charge pump, whose input is coupled to the AC voltage supply terminal, and whose output is coupled to the first node, wherein the AC voltage supply terminal is coupled to an AC voltage source, which provides an AC voltage only when the inverter is in operation, a control apparatus, wherein the control apparatus includes at least one input, an output and at least one supply terminal, a first electronic switch, a second electronic switch and a third electronic switch, each having a control electrode, a reference electrode and a working electrode, wherein the reference electrode of the first electronic switch and of the second electronic switch is coupled to the first node, wherein the working electrode of the first electronic switch is coupled to the supply terminal of the control apparatus, wherein the control electrode of the first electronic switch is coupled to the reference potential via a first voltage limiting apparatus, wherein the control electrode of the first electronic switch is coupled to the working electrode of the third electronic switch, wherein the control electrode of the third electronic switch is coupled to the output of the control apparatus, and the reference electrode of the third electronic switch is coupled to the reference potential, wherein the control electrode of the second electronic switch is coupled to the reference potential via a second voltage limiting apparatus, wherein the working electrode of the second electronic switch is coupled to the supply terminal of the control apparatus via a first diode, and wherein at least one further load, in particular the further control component parts mentioned above, is coupled to the working electrode of the second electronic switch.

Preferably, the breakdown voltage of the first voltage limiting apparatus is less than the breakdown voltage of the second voltage limiting apparatus. This ensures that, if the first electronic switch is on, the second electronic switch is off.

It is furthermore preferred that the drive circuit has a run up current, wherein the first nonreactive resistor has a value which is less than or equal to the quotient of the minimum voltage of the DC voltage source to be connected at the DC voltage supply terminal and the maximum run up current. It should be taken into consideration here that the drive circuit nevertheless consumes current even at voltages across the first capacitor which do not yet lead to run up of the drive circuit (undervoltage lockout). In this phase, in addition current is consumed by the control apparatus. If the sum of these two currents is low, there is the possibility of supplying the drive circuit via the first nonreactive resistor, the so-called run up resistor, without said drive circuit being separately shut down. If the drive circuit and/or the control apparatus requires too much current in the sleep mode of the circuit arrangement, however, separate shutdown of the drive circuit, as has been described in more detail further below with the introduction of a fourth electronic switch required for this purpose, is more advantageous.

Preferably, a second capacitor is connected in parallel with the working electrode-reference potential path of the second electronic switch. Said second capacitor can then be used to supply power to the further loads and also to the control apparatus, in the normal operating mode.

As has already been mentioned briefly above, a preferred development is characterized by the fact that the circuit arrangement furthermore includes a fourth electronic switch with a control electrode, a reference electrode and a working electrode, wherein the reference electrode-working electrode path of the fourth electronic switch is coupled between the first node and the supply terminal of the drive circuit, wherein the control electrode of the fourth electronic switch is coupled to the reference potential via the series circuit including a third voltage limiting apparatus and a second nonreactive resistor. This makes possible the variant which has already been mentioned briefly above and which prevents an excessively high current flowing away into the drive circuit in the sleep mode and therefore it no longer being possible for a sufficiently high current to be made available for the control apparatus.

Where $U_{D2}$ is the breakdown voltage of the first voltage limiting apparatus, $U_{D4}$ is the breakdown voltage of the second voltage limiting apparatus and $U_{D1}$ is the breakdown voltage of the third voltage limiting apparatus, the following is preferably true:

$$U_{D2} < U_{D1} < U_{D4}.$$

This measure ensures that, during run up, first the drive circuit is supplied with energy, and only once the inverter has been ramped up is the control apparatus and the remaining loads supplied with energy. In the sleep mode, however, this ensures that the drive circuit and the remaining loads are not supplied with any energy, but instead only the control apparatus is supplied with energy via a now new current path.

Preferably, the inverter is in the form of a half-bridge circuit, wherein the half-bridge center point represents the AC voltage source.

Provision can furthermore be made of a fourth voltage limiting apparatus, which is coupled between the first nonreactive resistor and the first capacitor, wherein the reference electrode of the fourth electronic switch is coupled to the node between the first nonreactive resistor and the fourth voltage limiting apparatus, wherein the output of the charge pump, the reference electrode of the first electronic switch and the reference electrode of the second electronic switch are coupled to the node between the fourth voltage limiting apparatus and the first capacitor. This embodiment takes into account the circumstance which may arise in which the difference between the voltage at which the drive circuit begins the operation and the maximum voltage to which the drive circuit clamps the voltage across the first capacitor is too small, with the result that it is no longer possible to find a suitable value for the zener voltage of the zener diode, which is preferably used as the second voltage limiting apparatus. The zener voltage of the zener diode, which is used as the second voltage limiting apparatus, and therefore the voltage across the first capacitor, upon the exceedence of which the second electronic switch is turned on, must firstly be markedly above the threshold voltage above which the drive circuit operates and secondly markedly below the clamping voltage of the drive circuit. In accordance with this embodiment, therefore, a fourth voltage limiting apparatus, in particular a fourth zener diode, is connected in series with the supply line for the drive circuit. By virtue of this zener diode, the above-mentioned difference can be increased. For problem-free operation, it is advantageous for the first nonreactive resistor to be connected not directly to the first capacitor, but to be connected to the anode of the zener diode, which acts as the fourth voltage limiting apparatus.

For a reliable supply of supply voltage to the control device, a voltage regulator is preferably coupled between the working electrode of the first electronic switch and the supply terminal of the control apparatus.

Preferably, at least the first, the second, the third and the fourth voltage limiting apparatus is furthermore in the form of a zener diode. Embodiments in which the first, the second, the third and the fourth voltage limiting apparatus are implemented by transistors or transistor circuits are likewise possible, but expensive.

Preferably, the first voltage limiting apparatus is coupled in series between the control electrode of the first electronic switch and the working electrode of the third electronic switch. In this case, the third electronic switch is preferably in the form of a bipolar transistor.

An alternative to this furthermore provides for a third nonreactive resistor, which is coupled between the control electrode of the first electronic switch and the working electrode of the third electronic switch, wherein the third electronic switch is in the form of a MOSFET, wherein the first voltage limiting apparatus is coupled firstly to the node between the third nonreactive resistor and the working electrode of the third electronic switch and secondly to the first node. While in an embodiment of the third electronic switch in the form of a bipolar transistor the control apparatus needs to make available the base current to the third electronic switch, in order that said electronic switch remains switched on, in an embodiment of the third electronic switch in the form of a MOSFET, the gate of said electronic switch only needs to be charged once. The latter embodiment is therefore characterized by a particularly low current consumption.

In the embodiment in which the third electronic switch is in the form of a bipolar transistor, a fourth nonreactive resistor can be coupled between the control electrode of the third electronic switch and the output of the control apparatus. Said fourth nonreactive resistor ensures that the output of the control apparatus is not clamped to the base/emitter voltage of the third electronic switch.

Further advantageous embodiments are given in the dependent claims.

The preferred embodiments proposed with reference to the circuit arrangement according to the invention and the advantages thereof are correspondingly true, if applicable, for the method according to the invention.

BRIEF DESCRIPTION OF THE DRAWING(S)

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

Figure 1:
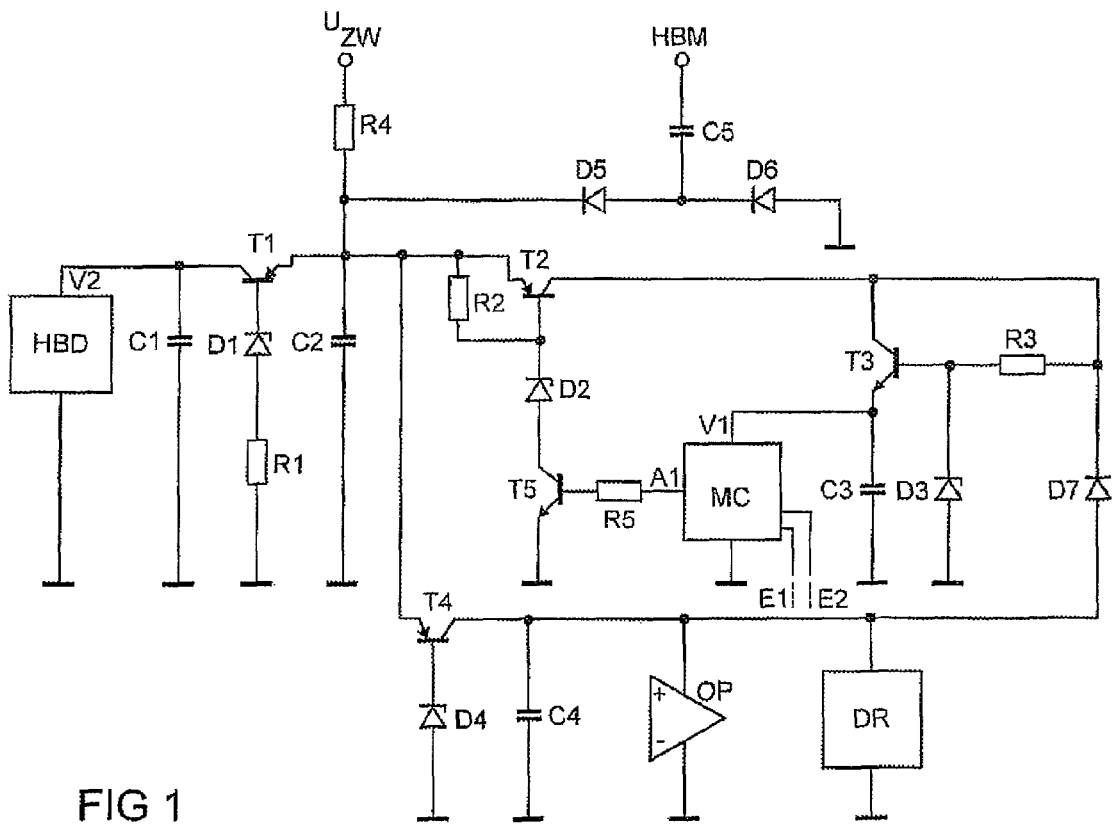
FIG. 1 shows a schematic illustration of a first exemplary embodiment of a circuit arrangement according to the invention.

FIG. 1 shows a first exemplary embodiment of a circuit arrangement according to the invention. The designation OP denotes analogue loads, and the designation DR denotes digital loads. They include the control component parts mentioned at the outset.

First, the capacitor C2 is charged slowly via the run up resistor R4 from a DC voltage source, which can in particular represent the intermediate circuit voltage U. The transistors T1 and T4 are off as long as the voltage across the capacitor C2 does not exceed the zener voltage of the zener diode D1, which switches on the transistor T1, and the zener diode D4, which switches on the transistor T4. A nonreactive resistor R1 is arranged in series with the zener diode D1 in order that the emitter voltage of the transistor T1 is not clamped violently.

The switch-on voltage for the transistor T1, which substantially corresponds to the zener voltage of the zener diode D1 (for improved understanding the small content owing to the base/emitter transition of the respectively associated transistor has been disregarded in the observations below), is selected such that it is lower than the voltage at which a half-bridge driver HPD begins its operation. The half-bridge driver HBD is supplied with voltage via a supply terminal V2. The switch-on voltage for the transistor T4, which substantially corresponds to the zener voltage of the zener diode D4, is selected such that it is greater than the voltage at which the half-bridge driver HBD begins its operation. This ensures that the loads OP, DR are supplied with voltage only when a charge pump, which includes the diodes D5 and D6 and the capacitor C5, functions as a current source and therefore sufficient supply power is available. For this purpose, the AC voltage supply terminal HBM of the charge pump D5, D6, C5 is connected to the half-bridge center point of a half-bridge circuit.

The transistor T2 is off as long as the transistor T5 is switched off.

A microcontroller MC, which acts as the control apparatus, is supplied in the normal operating mode of the circuit arrangement from the capacitor C2, via the transistor T4, the diode D7 and a voltage regulator, which includes a transistor T3, a diode D3, a resistor R3 and a capacitor C3, from the supply voltage provided by the charge pump D5, D6, C5. In order to set the circuit arrangement to a sleep mode on the basis of signals received at the inputs E1, E2 of the microcontroller MC, the transistor T5 is switched on by the microcontroller MC via its output A1. As a result, the zener diode D2 clamps, via the transistor T2, the voltage across the capacitor C2 to a value which substantially corresponds to the zener voltage of the zener diode D2.

This clamping voltage defined by the zener diode D2 is below the zener voltages of the zener diode D1 and the zener diode D4, as a result of which both the half-bridge driver HBD and the remaining loads OP, DR are deenergized. The charge pump D5, D6, C5 then no longer functions because the potential to which C5 is connected no longer has an AC voltage content which can be coupled out.

The total current which is available as a result of the nonreactive resistor R4 is made available via the transistor T2 to the microcontroller MC, which supplies said current to a sufficient extent in the sleep state of the circuit arrangement. In the process, the diode D7 prevents parts of the current flowing through the nonreactive resistor R4 being capable of flowing away into the other loads OP, DR, since said diode is reverse-biased in the sleep state. Even in this sleep state of the ballast, in which the microcontroller MC is supplied via the nonreactive resistor R4, the voltage regulator formed from the transistor T3, the nonreactive resistor R3, the diode D3 and the capacitor C3 regulates the supply voltage for the microcontroller MC, which supply voltage is supplied to said microcontroller MC at the supply terminal V1.

A nonreactive resistor R5 is arranged between the output A1 of the microcontroller MC and the control electrode of the transistor T5 and ensures that the output of the microcontroller MC is not clamped to the base/emitter voltage of the transistor T5.

A nonreactive resistor R2, which is arranged in parallel with the reference electrode-control electrode path of the transistor T2, prevents unintentional switching on of the transistor T2.

In a preferred exemplary embodiment, the zener voltage of the diode D1 is 12 V, the zener voltage of the diode D4 is 15 V and the zener voltage of the diode D2 is 8 V.

Figure 2:
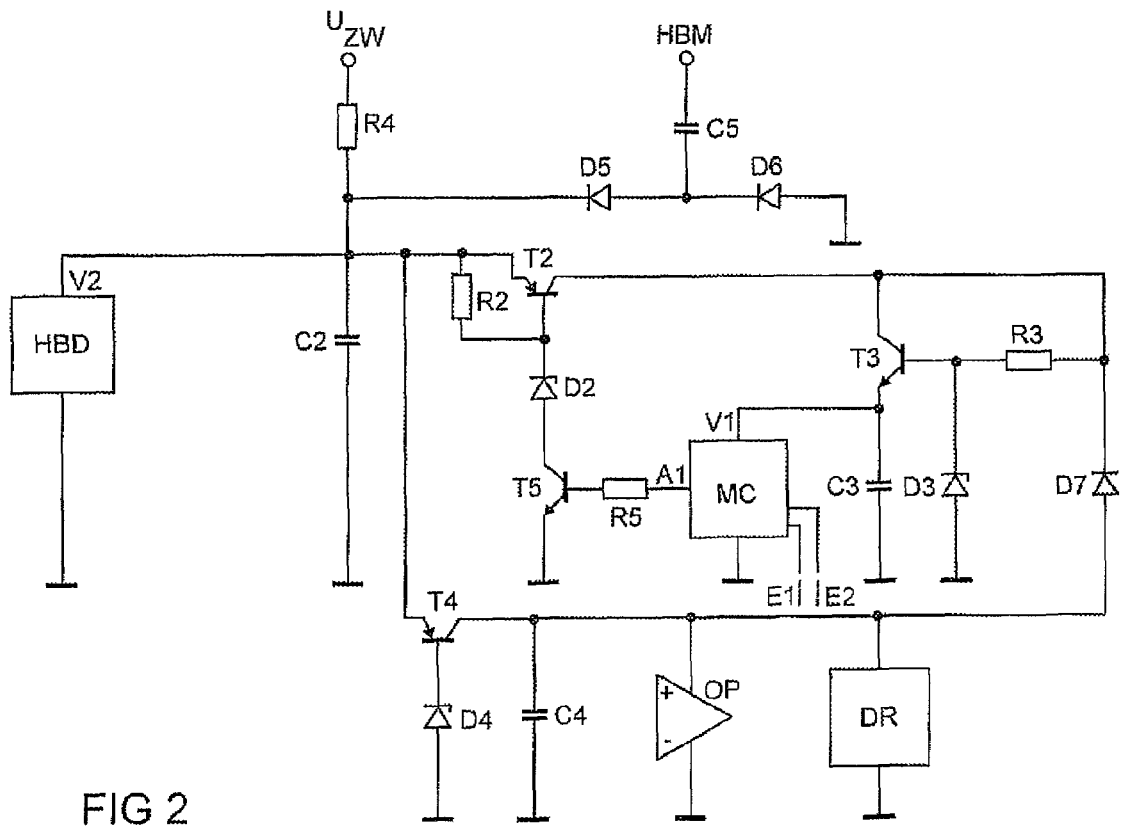
FIG. 2 shows a schematic illustration of a second exemplary embodiment of a circuit arrangement according to the invention.

The embodiment of a circuit arrangement according to the invention illustrated in FIG. 2 is simplified in comparison with the embodiment shown in FIG. 1 by virtue of the fact that the transistor T1, the diode D1, the nonreactive resistor R1 and the capacitor C1 are emitted. It is possible to dispense with the latter components, which made active shutdown of the half-bridge driver HBD possible, if the sum of the run up current of the half-bridge driver HBD and the current required in the sleep mode for the microcontroller MC is small enough to be fed via the run up resistor R4. This takes into consideration the fact that the half-bridge driver HBD also consumes current in its switched-off state if a voltage is present at its supply terminal V2 which is so low that the half-bridge driver HBD is in the undervoltage lockout operating mode. If this current consumption is too high, the embodiment shown in FIG. 1 is preferred.

If the difference between the voltage at which the half-bridge driver HBD begins its operation and the maximum voltage to which it clamps the supply voltage, i.e. the voltage across the capacitor C2, is too low, it is no longer possible to find a suitable value for the zener voltage of the zener diode D4. The zener voltage of the zener diode D4 and therefore the voltage across the capacitor C2, upon the exceedence of which the transistor T4 is turned on, needs to be firstly markedly above the threshold voltage above which the half-bridge driver HBD operates, the so-called undervoltage lockout threshold, and secondly markedly below the clamping voltage of the half-bridge driver HBD.

Figure 3:
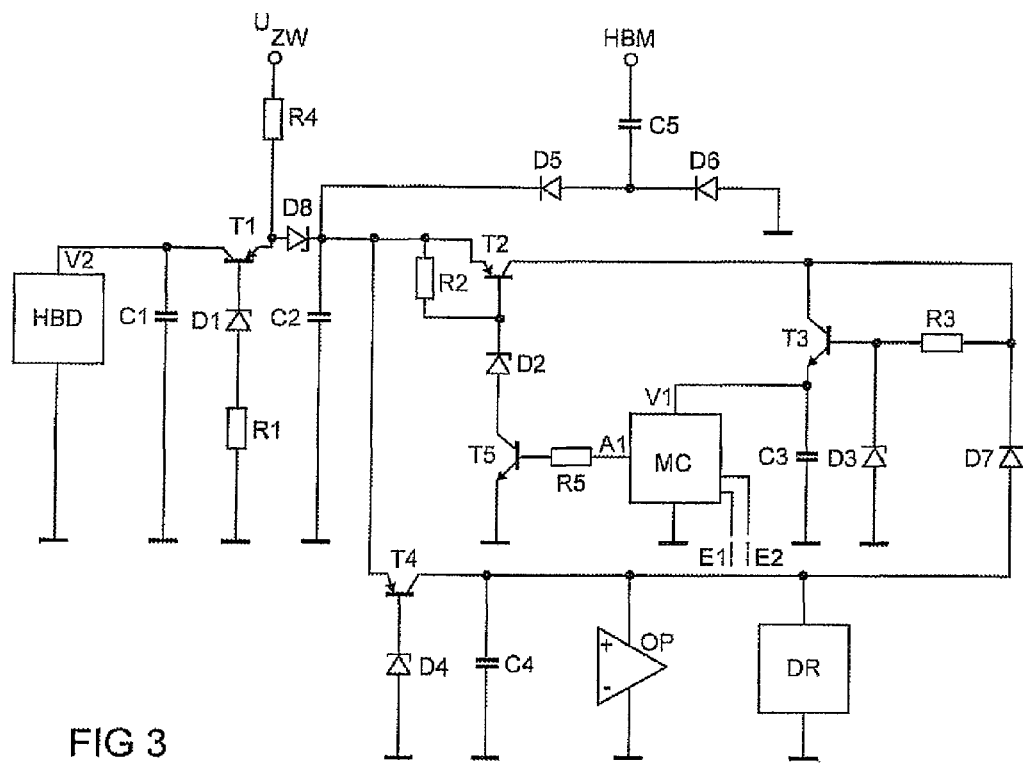
FIG. 3 shows a schematic illustration of a third exemplary embodiment of a circuit arrangement according to the invention.

In the embodiment shown in FIG. 3, therefore, a further zener diode D8 is connected in series with the supply line for the half-bridge driver HBD. By virtue of this zener diode D8, the abovementioned difference can be increased. For problem-free operation, it is advantageous to connect the run up resistor R4 not directly to the capacitor C2, but to the anode of the zener diode D8. The clamping action of the half-bridge driver HBD is produced as a result of a zener diode (not illustrate), which is arranged in the half-bridge driver. Said zener diode operates if the transistor T1 is switched on. When viewed from the capacitor C2, the sum of the clamping voltage of the zener diode D8 and of the clamping voltage of the internal zener diode (not illustrated) of the half-bridge driver HBD therefore acts as clamping voltage.

Figure 4:
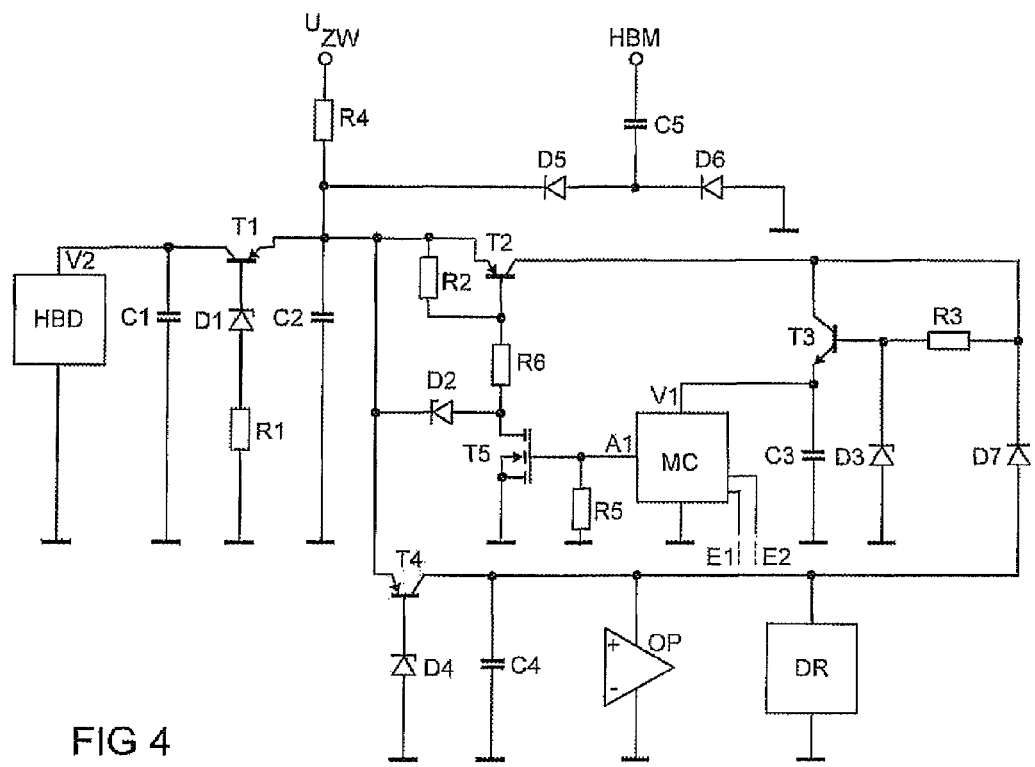
FIG. 4 shows a schematic illustration of a fourth exemplary embodiment of a circuit arrangement according to the invention.

The embodiment shown in FIG. 4 is characterized by the fact that it requires a lower current through the run up resistor R4 than the three other embodiments. For this purpose, the transistor T5 is in the form of a MOSFET transistor, wherein the nonreactive resistor R5 is now coupled between the output A1 of the microcontroller MC and the reference potential. The arrangement of the resistor R5 shown in FIG. 4 ensures that the transistor T5 cannot be switched on unintentionally. The resistor R5 ensures that the transistor T5 is only switched on when the output A1 of the microcontroller MC is at Active High. Moreover, a nonreactive resistor R6 is provided, which is coupled in series between the control electrode of the transistor T2 and the working electrode of the transistor T5. The zener diode D2 is coupled to the working electrode of the transistor T5, as a result of which the capacitor C2 is clamped in the switched-on state of the transistor T5 via the zener diode D2. In this case, the voltage content which drops across the nonreactive resistor R2 is so great that the transistor T2 remains on. As a result, the base at the transistor T2 can be reduced to lower values, wherein the transistor T2 then always remains switched on.

In comparison with the other embodiments, the gate of the transistor T5, which is in the form of a MOSFET, only needs to be charged once; the transistor T5 furthermore does not consume any current. In contrast to this, the transistor T5 in the form of a bipolar transistor from the three other embodiments consumes a certain base current in order to remain switched on. This base current needs to be made available by the microcontroller MC, and this is of course only possible when this current is supplied to the microcontroller MC.

Figure 5:
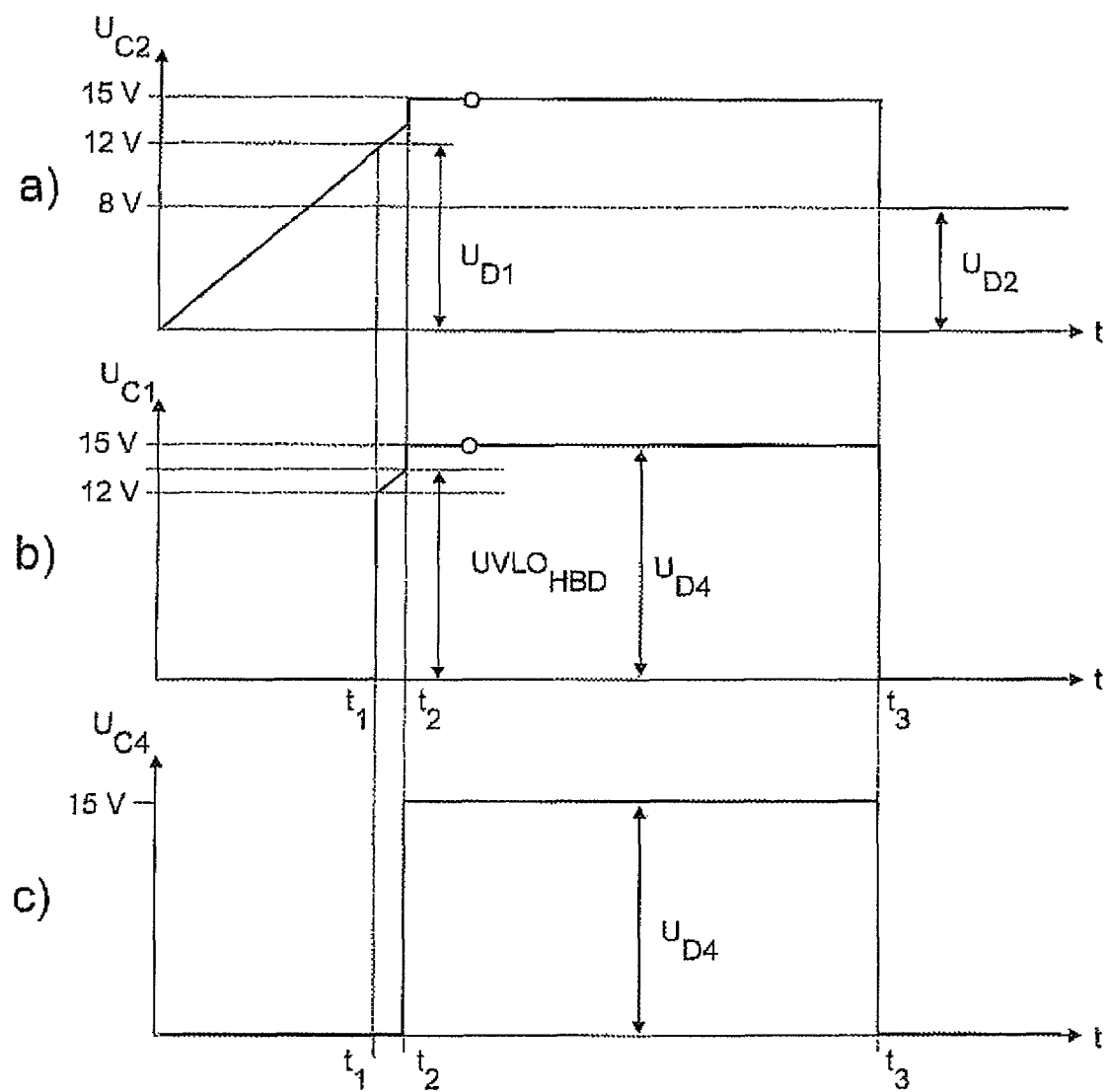
FIG. 5 shows the time profile of some electrical variables for the embodiment shown in FIG. 1.

In order to explain the operation of a circuit arrangement according to the invention, reference is made to FIG. 5. Said figure shows, schematically, the time profile of the voltages across the capacitors C1, C2 and C4 for the exemplary embodiment shown in FIG. 1.

For the embodiments below, it is furthermore assumed that the zener voltage of the zener diode D1 is 12 V, the zener voltage of the zener diode D2 is 8 V and the zener voltage of the zener diode D4 is 15 V.

First, the capacitor C2 is charged gradually via the nonreactive resistor R4. The voltage $U_{c2}$ increases slowly.

As soon as the voltage $U_{c2}$ has reached 12 V at time $t_1$, the transistor T1 transfers to the on state. The voltage across the capacitor C1 likewise increases to 12 V and then continues to increase in synchronism with the voltage across the capacitor C2. At time $t_2$, the voltage across the capacitor C1 has reached a value which is above the undervoltage lockout voltage of the half-bridge driver HBD. As a result, the half-bridge driver HBD is set into operation, as a result of which the charge pump begins its operation and the voltage across the capacitor C2 and therefore the voltage across the capacitor C1 continue to increase. As a result of the zener diode D4, the voltage across the capacitors C1, C2 is clamped to the zener voltage of the zener diode D4. As soon as the voltage across the capacitor C2 has reached the zener voltage of the zener diode D4, the transistor T4 switches on, as a result of which the voltage across the capacitor C4 increases to 15 V.

At time $t_3$, criteria are present at the inputs E1, E2 of the microcontroller MC which result in the microcontroller MC setting the circuit arrangement to the sleep mode. For this purpose, said microcontroller switches on the transistor T5, as a result of which the transistor T2 is switched on. As a result, the voltage across the capacitor C2 is clamped to the zener voltage of the zener diode D2 (see FIG. 5a). The transistors T1 and T4 are off. As a result, the voltage across the capacitor C1 and the voltage across the capacitor C4 are reduced to zero. The loads OP and DR are no longer supplied with current, in the same way as the half-bridge driver HBD. In contrast to this, only the microcontroller MC is supplied with energy via the nonreactive resistor R4 and the transistor T2.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A circuit arrangement with a switchable voltage supply for a control apparatus, wherein the circuit arrangement comprises:
   a DC voltage supply terminal for connection to a DC voltage source; and
   an AC voltage supply terminal for connection to an AC voltage source;
   a first capacitor, whose first terminal is coupled to the DC voltage supply terminal via a first nonreactive resistor so as to form a first node, and whose second terminal is coupled to a reference potential;
   a drive circuit for driving the switch of an inverter, wherein the drive circuit has a supply terminal, which is coupled to the first node;
   a charge pump, whose input is coupled to the AC voltage supply terminal, and whose output is coupled to the first node, wherein the AC voltage supply terminal is coupled to an AC voltage source, which provides an AC voltage only when the inverter is in operation;

the control apparatus, wherein the control apparatus comprises at least one input, an output and at least one supply terminal;

a first electronic switch, a second electronic switch and a third electronic switch, each having a control electrode, a reference electrode and a working electrode, wherein the reference electrode of the first electronic switch and of the second electronic switch is coupled to the first node;

wherein the working electrode of the first electronic switch is coupled to the supply terminal of the control apparatus;

wherein the control electrode of the first electronic switch is coupled to the reference potential via a first voltage limiting apparatus, wherein the control electrode of the first electronic switch is coupled to the working electrode of the third electronic switch, wherein the control electrode of the third electronic switch is coupled to the output of the control apparatus, and the reference electrode of the third electronic switch is coupled to the reference potential;

wherein the control electrode of the second electronic switch is coupled to the reference potential via a second voltage limiting apparatus;

wherein the working electrode of the second electronic switch is coupled to the supply terminal of the control apparatus via a first diode; and wherein at least one further load is coupled to the working electrode of the second electronic switch.

2. The circuit arrangement as claimed in claim 1, wherein the breakdown voltage of the first voltage limiting apparatus is less than the breakdown voltage of the second voltage limiting apparatus.

3. The circuit arrangement as claimed in claim 1, wherein the drive circuit has a run up current, wherein the first nonreactive resistor has a value which is less than or equal to the quotient of the minimum voltage of the DC voltage source to be connected at the DC voltage supply terminal and the maximum run up current.

4. The circuit arrangement as claimed in claim 1, wherein a second capacitor is connected in parallel with the working electrode-reference potential path of the second electronic switch.

5. The circuit arrangement as claimed in claim 1, wherein the circuit arrangement furthermore comprises a fourth electronic switch with a control electrode, a reference electrode and a working electrode, wherein the reference electrode-working electrode path of the fourth electronic switch is coupled between the first node and the supply terminal of the drive circuit, wherein the control electrode of the fourth electronic switch is coupled to the reference potential via the series circuit comprising a third voltage limiting apparatus and a second nonreactive resistor.

6. The circuit arrangement as claimed in claim 5, wherein the following is true for the breakdown voltages of the first voltage limiting apparatus $U_{D2}$, the second voltage limiting apparatus $U_{D4}$ and the third voltage limiting apparatus $U_{D1}$: $U_{D2} < U_{D1} < U_{D4}$.

7. The circuit arrangement as claimed in claim 1, wherein the inverter is in the form of a half-bridge circuit, wherein the half-bridge center point represents the AC voltage source.

8. The circuit arrangement as claimed in claim 1, wherein the circuit arrangement furthermore comprises a fourth voltage limiting apparatus, which is coupled between the first nonreactive resistor and the first capacitor, wherein the reference electrode of the fourth electronic switch is coupled to the node between the first nonreactive resistor and the fourth voltage limiting apparatus, wherein the output of the charge pump, the reference electrode of the first electronic switch and the reference electrode of the second electronic switch are coupled to the node between the fourth voltage limiting apparatus and the first capacitor.

9. The circuit arrangement as claimed in claim 1, wherein a voltage regulator is coupled between the working electrode of the first electronic switch and the supply terminal of the control apparatus.

10. The circuit arrangement as claimed in claim 1, wherein at least the first, the second, the third and the fourth voltage limiting apparatus is in the form of a zener diode.

11. The circuit arrangement as claimed in claim 1, wherein the first voltage limiting apparatus is coupled in series between the control electrode of the first electronic switch and the working electrode of the third electronic switch.

12. The circuit arrangement as claimed in claim 1, wherein it furthermore comprises a third nonreactive resistor, which is coupled between the control electrode of the first electronic switch and the working electrode of the third electronic switch, wherein the third electronic switch is in the form of a MOSFET, wherein the first voltage limiting apparatus is coupled firstly to the node between the third nonreactive resistor and the working electrode of the third electronic switch and secondly to the first node.

13. The circuit arrangement as claimed in claim 1, wherein a fourth nonreactive resistor is coupled between the control electrode of the third electronic switch and the output of the control apparatus.

14. A method for switching over a voltage supply for a control apparatus in a circuit arrangement having a DC voltage supply terminal for connection to a DC voltage source and an AC voltage supply terminal for connection to an AC voltage source;

the method comprising:

a) charging of a first capacitor, which is coupled to the DC voltage supply terminal via a first nonreactive resistor so as to form a first node;

b) on reaching a first predeterminable voltage threshold for the voltage across the first capacitor, which voltage threshold is greater than the minimum voltage for run up of a drive circuit for driving the switches of an inverter, wherein the AC voltage supply terminal is coupled to an AC voltage potential supplied by the inverter:

activation of the drive circuit and therefore provision of an AC voltage at the AC voltage supply terminal;

c) on reaching a second predeterminable voltage threshold for the voltage across the first capacitor, which voltage threshold is greater than the first predeterminable voltage threshold:

switching on of the reference electrode-working electrode path of a first electronic switch, wherein the supply terminal of the control apparatus and at least one further load is coupled to the working electrode of the first electronic switch, wherein the reference electrode of the first electronic switch is coupled to the first node;
d) onset of a state for switching over the voltage supply for the control apparatus;
e) switching on of a second electronic switch, which is coupled to the output of the control apparatus and is coupled in series between the first node and the supply terminal of the control apparatus; and clamping of the voltage across the first capacitor by means of a voltage limiting apparatus to a value which is less than the minimum voltage for run up of the drive circuit and therefore:

deactivation of the drive circuit; and switching off of the first electronic switch.

* * * * *